United States Patent [19]

Pritchard et al.

[11] Patent Number: 5,890,986

[45] Date of Patent: Apr. 6, 1999

[54] TRANSMISSION FOR FOUR-WHEEL DRIVE VEHICLES

[75] Inventors: Larry A. Pritchard, Sterling Heights, Mich.; Parvinder Ahluwalia, Manlius, N.Y.

[73] Assignee: New Venture Gear, Inc., Troy, Mich.

[21] Appl. No.: 88,305

[22] Filed: Jun. 1, 1998

Related U.S. Application Data

[63] Continuation of Ser. No. 896,039, Jul. 17, 1997, abandoned, which is a continuation of Ser. No. 687,673, Jul. 26, 1996, Pat. No. 5,704,866.

[51] Int. Cl.⁶ .................................................. F16H 37/08
[52] U.S. Cl. .......................... 475/206; 475/204; 475/208; 180/248
[58] Field of Search .............................. 475/85, 198, 204, 475/205, 206, 207, 208, 220, 199; 180/247, 248, 249; 74/665 GA

[56] References Cited

U.S. PATENT DOCUMENTS

| | | |
|---|---|---|
| 2,262,710 | 11/1941 | Lang . |
| 3,235,021 | 2/1966 | Hill . |
| 3,732,943 | 5/1973 | Panhard . |
| 4,031,780 | 6/1977 | Dolan et al. ............................... 475/85 |
| 4,671,136 | 6/1987 | Katayama . |
| 4,805,720 | 2/1989 | Clenet . |
| 5,069,305 | 12/1991 | Kobayashi .............................. 180/249 |
| 5,499,951 | 3/1996 | Showalter ............................... 475/204 |
| 5,556,350 | 9/1996 | Madsack .................................... 475/85 |
| 5,584,776 | 12/1996 | Weilant et al. ...................... 475/207 X |
| 5,599,249 | 2/1997 | Zalewski et al. .................... 475/206 X |
| 5,604,882 | 2/1997 | Mueller . |
| 5,609,540 | 3/1997 | Brissenden et al. ................ 180/248 X |
| 5,651,749 | 7/1997 | Wilson et al. ....................... 475/198 X |
| 5,662,543 | 9/1997 | Forsyth .................................... 475/198 |
| 5,688,202 | 11/1997 | Bowen .................................... 475/199 |
| 5,702,321 | 12/1997 | Bakowski et al. ...................... 475/199 |
| 5,704,863 | 1/1998 | Zalewski et al. .................... 475/206 X |
| 5,762,578 | 6/1998 | Forsyth .................................... 475/198 |

FOREIGN PATENT DOCUMENTS

| | | |
|---|---|---|
| 0179991 | 5/1986 | European Pat. Off. . |
| 2695880 | 3/1994 | France . |
| 722269 | 1/1955 | United Kingdom . |
| 2035930 | 6/1980 | United Kingdom . |
| 2168015 | 6/1986 | United Kingdom . |
| 2304659 | 3/1997 | United Kingdom . |
| WO97/46406 | 12/1997 | WIPO . |
| WO97/46407 | 12/1997 | WIPO . |

OTHER PUBLICATIONS

European Patent Office, Patent Abstracts Of Japan, Applicant: Iseki & Co. Ltd, Application No. 58183575 Dated Sep. 30, 1983, Publication No. 60076422 Dated Apr. 30, 1985, Inventor: Kataue Nozomi, Title: Transmission Mechanism For Tractor.

*Primary Examiner*—Dirk Wright
*Assistant Examiner*—Peter I. Kwon
*Attorney, Agent, or Firm*—Harness, Dickey & Pierce, P.L.C.

[57] ABSTRACT

The transmission of the present invention includes a multi-speed geartrain comprised of an input shaft, a mainshaft, and a plurality of constant-mesh gearsets arranged for selectively coupling the mainshaft to the input shaft for driven rotation at various speed ratios. The mainshaft can be selectively coupled to the power transfer arrangement for establishing two alternative power transmission routes. In particular, the range shift mechanism is provided for establishing a high-range power transmission route and a low-range power transmission route from the mainshaft to a quill shaft which, in turn, drives the interaxle differential. The torque delivered by the quill shaft is split by the interaxle differential between the front and rear drivelines to establish the full-time four-wheel high-range and low-range drive modes. Optionally, the torque transfer apparatus can be provided for controlling speed differentiation across the interaxle differential or in place of the interaxle differential for on-demand four-wheel drive operation. The torque transfer apparatus can be a speed-sensitive device or an electronically-controlled transfer clutch.

17 Claims, 10 Drawing Sheets

5,890,986

TRANSMISSION FOR FOUR-WHEEL DRIVE VEHICLES

This is a continuation of U.S. patent application Ser. No. 08/896,039, filed Jul. 17, 1997, abandoned which is a continuation of U.S. patent application Ser. No. 08/687,673 filed Jul. 26, 1996, now U.S. Pat. No. 5,704,866.

BACKGROUND OF THE INVENTION

The present invention relates generally to transmissions for use in four-wheel drive vehicles. More particularly, the present invention is directed to a transmission having a multi-speed geartrain and a power transfer arrangement contained in a single gearbox.

As is known, the majority of four-wheel drive vehicles are equipped with a transfer case mounted to a multi-speed transmission for directing power to all four wheels. To accommodate different road surfaces and conditions, many transfer cases are equipped with a gear reduction unit that can be shifted by the vehicle operator for establishing high-range (i.e., direct) and low-range (i.e., reduced ratio) four-wheel drive modes. Likewise, some transfer cases are equipped with an interaxle differential for delivering drive torque to the front and rear drivelines of the four-wheel drive vehicle while permitting speed differentiation therebetween.

In an effort to minimize the overall size of the drivetrain used in four-wheel drive vehicles, it has been proposed to utilize a transmission of a transaxle-type normally used to drive the front wheels of a front wheel drive vehicle as a four-wheel drive geartrain. In particular, British Patent No. 2,035,930 to Jones et al. teaches of rotating the front wheel drivetrain (i.e., engine and transaxle) such that the transaxle outputs can be interconnected to the front and rear drivelines of the motor vehicle. While such an arrangement may provide an economical drivetrain layout for a full-time four-wheel drive vehicle, the practical applications for such an arrangement are severely limited. For instance, such an arrangement does not permit the vehicle operator to selectively shift between high and low four-wheel drive modes.

Accordingly, the need exists for a transmission which can be used in most conventional four-wheel drive applications and which permits the vehicle operator to selectively shift between the available gear ratios and drive modes.

SUMMARY OF THE INVENTION

It is therefore an object of the present invention to provide a transmission for use with four-wheel drive vehicles having a multi-speed geartrain and a power transfer arrangement integrated into a single gearbox.

The present invention is directed to a transmission having an input shaft adapted to be driven about a first rotary axis, a first output shaft supported for rotation about a second rotary axis, and a second output shaft supported for rotation about a third rotary axis. The geartrain is operable for selectively delivering drive torque from the input shaft to the power transfer arrangement at one of a plurality of forward and reverse gear ratios. In turn, the power transfer arrangement selectively delivers drive torque to each of the first and second output shafts. In one preferred form, the power transfer arrangement is equipped with a gear reduction unit, an interaxle differential, and a range shift mechanism that are cooperatively operable for establishing full-time four-wheel high-range and low-range drive modes and a neutral non-driven mode.

A further object of the present invention is to provide the power transfer arrangement with a synchronized range shift mechanism for permitting the vehicle operator to shift "on-the-fly" between the four-wheel high-range and low-range drive modes.

According to yet another feature, the transmission of the present invention is equipped with a torque transfer apparatus for controlling the torque biasing across the interaxle differential in response to speed differentials between the front and rear output shafts.

According to an alternative embodiment, the power transfer arrangement is equipped with a torque transfer apparatus that is operably located between the first and second output shafts for establishing on-demand four-wheel high-range and low-range drive modes.

The transmission of the present invention includes a multi-speed geartrain comprised of an input shaft, a mainshaft, and a plurality of constant-mesh gearsets arranged for selectively coupling the mainshaft to the input shaft for driven rotation at various speed ratios. The mainshaft can be selectively coupled to the power transfer arrangement for establishing two alternative power transmission routes. In particular, the range shift mechanism is provided for establishing a high-range power transmission route and a low-range power transmission route from the mainshaft to a quill shaft which, in turn, drives the interaxle differential. The torque delivered by the quill shaft is split by the interaxle differential between the front and rear drivelines to establish the full-time four-wheel high-range and low-range drive modes. Optionally, the torque transfer apparatus can be provided for controlling speed differentiation across the interaxle differential or in place of the interaxle differential for on-demand four-wheel drive operation.

As a further object, the torque transfer apparatus can be a speed-sensitive device or an electronically-controlled transfer clutch.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

The present invention relates to a multi-speed transmission for use in four-wheel drive vehicles. In general, the transmission integrates a multi-speed geartrain and a power transfer arrangement into a common gearbox that is adapted for use with a longitudinally-aligned engine. More particularly, the geartrain can be manually shifted to provide a plurality of forward gears and a reverse gear. Power from the geartrain is delivered to the power transfer arrangement for distribution to the vehicle's front and rear drivelines. The power transfer arrangement includes a gear reduction unit and a range shift mechanism that cooperate to permit the vehicle to be shifted between a high-range (i.e., direct speed ratio) and a low-range (i.e., reduced speed ratio). The range shift mechanism can be synchronized to permit "on-the-fly" range shifting. Additionally, the power transfer arrangement includes an interaxle differential that interconnects the output of the gear reduction unit to the front and rear drivelines for establishing full-time (i.e., "differentiated") four-wheel high-range and low-range drive modes. As a further option, a torque transfer apparatus may also be provided for controlling speed differentiation and torque biasing across the interaxle differential. Finally, the power transfer arrangement may incorporate an on-demand arrangement for automatically transferring power from the geartrain to a normally non-driven driveline for establishing an on-demand four-wheel drive mode. As will be understood, the novel transmission to be disclosed hereinafter is shown in a merely exemplary vehicular application to which modifications can be made.

Figure 1:
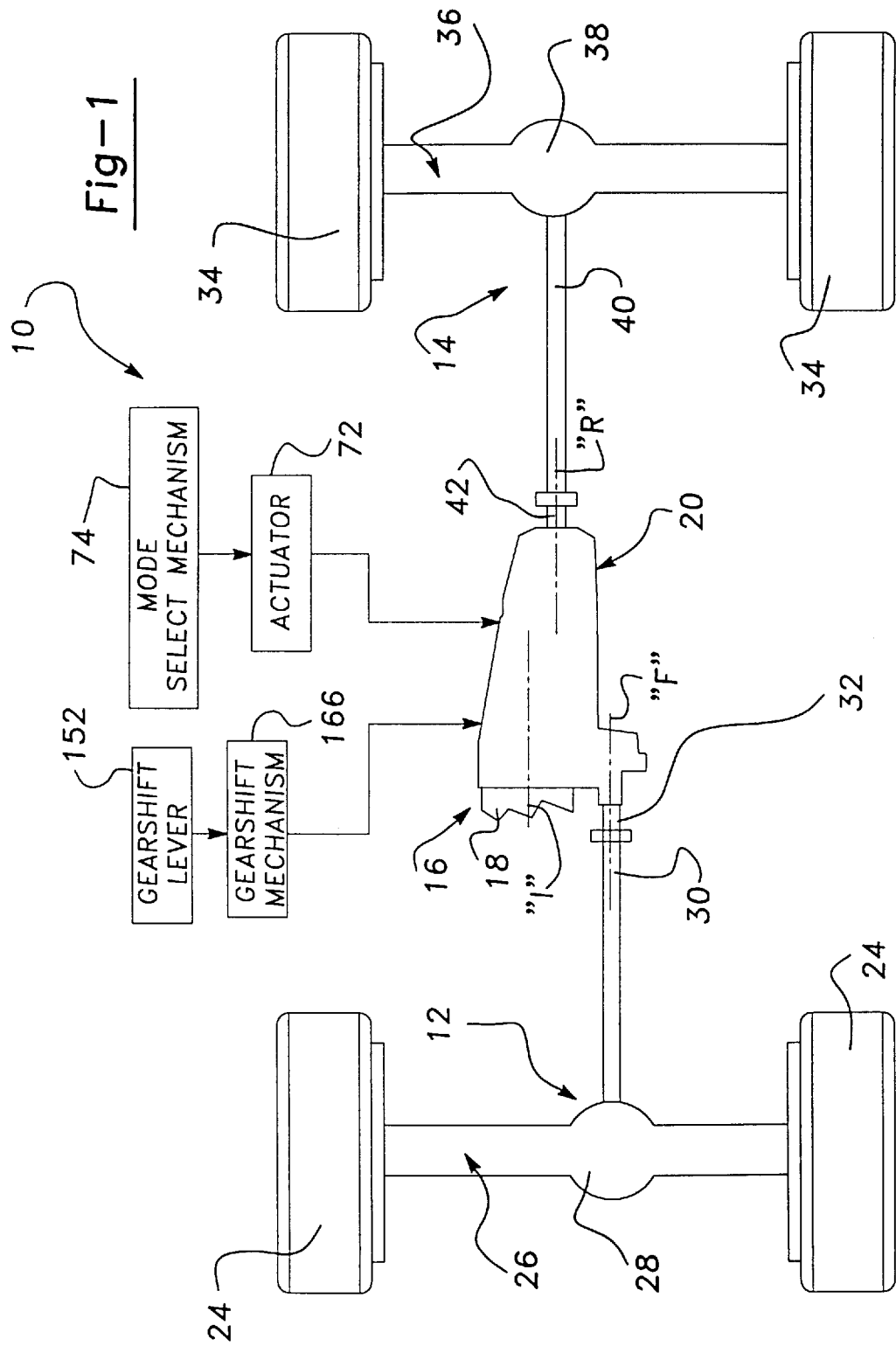
FIG. 1 is a functional illustration of a motor vehicle equipped with the 4WD transmission of the present invention.

Referring to FIG. 1, a vehicle 10 is schematically shown which is suited for use with the present invention. Vehicle 10 has a front driveline 12 and a rear driveline 14 drivable via connection to a powertrain 16. Powertrain 16 includes an engine 18 and a transmission 20. Engine 18 is mounted in an in-line or longitudinal orientation along the long axis of vehicle 10 and its output is selectively coupled via a conventional clutch to the input of transmission 20. As will be detailed hereinafter with greater specificity, the input to transmission 20 is commonly aligned with the output of engine 18 for rotation about a rotary axis, denoted by reference letter "I". Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transmission 20. As seen, front output shaft 32 is supported in transmission 20 to rotate about a rotary axis, denoted by reference letter "F". Similarly, rear driveline 14 includes a pair of rear wheels 34 connected at opposite ends of a rear axle assembly 36 having a rear differential 38 coupled to one end of a rear prop shaft 40, the opposite end of which is interconnected to a rear output shaft 42 of transmission 20. Rear output shaft 42 is likewise shown to be supported within transmission 20 for rotation about a rotary axis, denoted by reference letter "R".

With particular reference to FIGS. 2 through 5, transmission 20 is shown to include two primary sections, namely, a multi-speed geartrain 44 and a power transfer arrangement 46. Geartrain 44 includes an input shaft 48 that is rotatably driven by the output of engine 18, a mainshaft 50, and a series of constant-mesh gearsets 52, 54, 56, 58 and 60. Each gearset can be selectively engaged for coupling mainshaft 50 to input shaft 48 for rotation at a predetermined gear or speed ratio. Thus, power from engine 18 is selectively delivered from input shaft 48 to mainshaft 50 through the gearsets. Power is thereafter delivered from mainshaft 50 to front and rear output shafts 32 and 42 through power transfer arrangement 46. Power transfer arrangement 46 includes a gear reduction unit 62 driven by mainshaft 50, an interaxle differential 64 having outputs coupled to front output shaft 32 and rear output shaft 42 for distributing drive torque and permitting speed differentiation therebetween, a quill shaft 66 coupled to the input of interaxle differential 64, and a range shift mechanism 68 having a range clutch 70 that is movable for selectively coupling quill shaft 66 with either of mainshaft 50 or gear reduction unit 62. As diagrammatically shown in FIG. 1, range shift mechanism 68 also includes a shift actuator 72 for moving range clutch 70 in response to an input by the vehicle operator for establishing one of three available modes. These modes include full-time four-wheel drive high-range and low-range drive modes and a neutral non-driven mode. A mode select mechanism 74 is manipulated by the vehicle operator for signalling shift actuator 72 of the particular mode selected.

With continued reference to FIGS. 2 through 5, transmission 20 is shown to include a housing 76 defined by a series of housing sections that are interconnected via fasteners 78. Input shaft 48 is shown supported in housing 76 by bearing assemblies 80 and 82 for rotation about rotary axis "I". Mainshaft 50 is an elongated tubular shaft that concentrically surrounds and is rotatably supported on a transfer shaft 84, with mainshaft 50 being supported in housing 76 by bearing assemblies 86 and 88. Likewise, one end of transfer shaft 84 is rotatably supported in housing 76 by a bearing assembly 90 while its opposite end is piloted in a bore 92 formed in one end of rear output shaft 42. Rear output shaft 42 is supported in housing 76 via a bearing assembly 94. A rear yoke 96 is shown secured to the opposite end of rear output shaft 42 for connection to rear driveline 14 in an otherwise conventional manner. Thus, mainshaft 50, transfer shaft 84 and rear output shaft 42 are commonly aligned for rotation about rotary axis "R".

Figure 3:
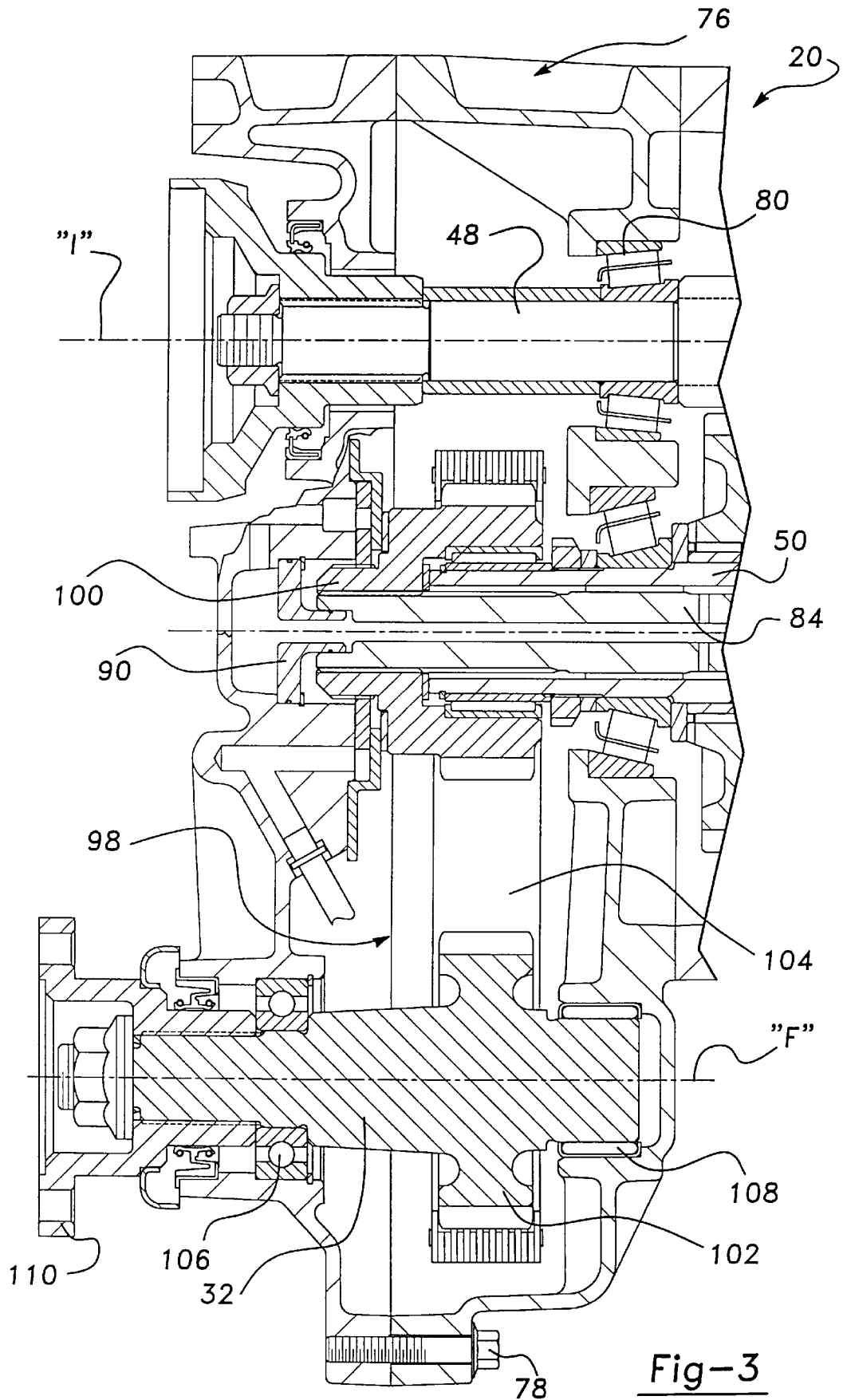
FIG. 3 through 5 are enlarged partial views of FIG. 2 showing various components of the transmission in greater detail.

As best seen from FIG. 3, transmission 20 includes a front transfer mechanism 98 that is provided for transferring drive torque from transfer shaft 84 to front output shaft 32. More particularly, front transfer mechanism 98 includes a drive sprocket 100 fixed (i.e., splined) to transfer shaft 84, a second driven sprocket 102 formed integrally with front output shaft 32, and a drive chain 104 interconnecting driven sprocket 102 to drive sprocket 100. Front output shaft 32 is shown supported from housing 76 by a pair of axially spaced bearing assemblies 106 and 108 for rotation about the "F" rotary axis. A front yoke 110 is shown secured to front output shaft 32 for connection to the remainder of front driveline 12.

Figure 2:
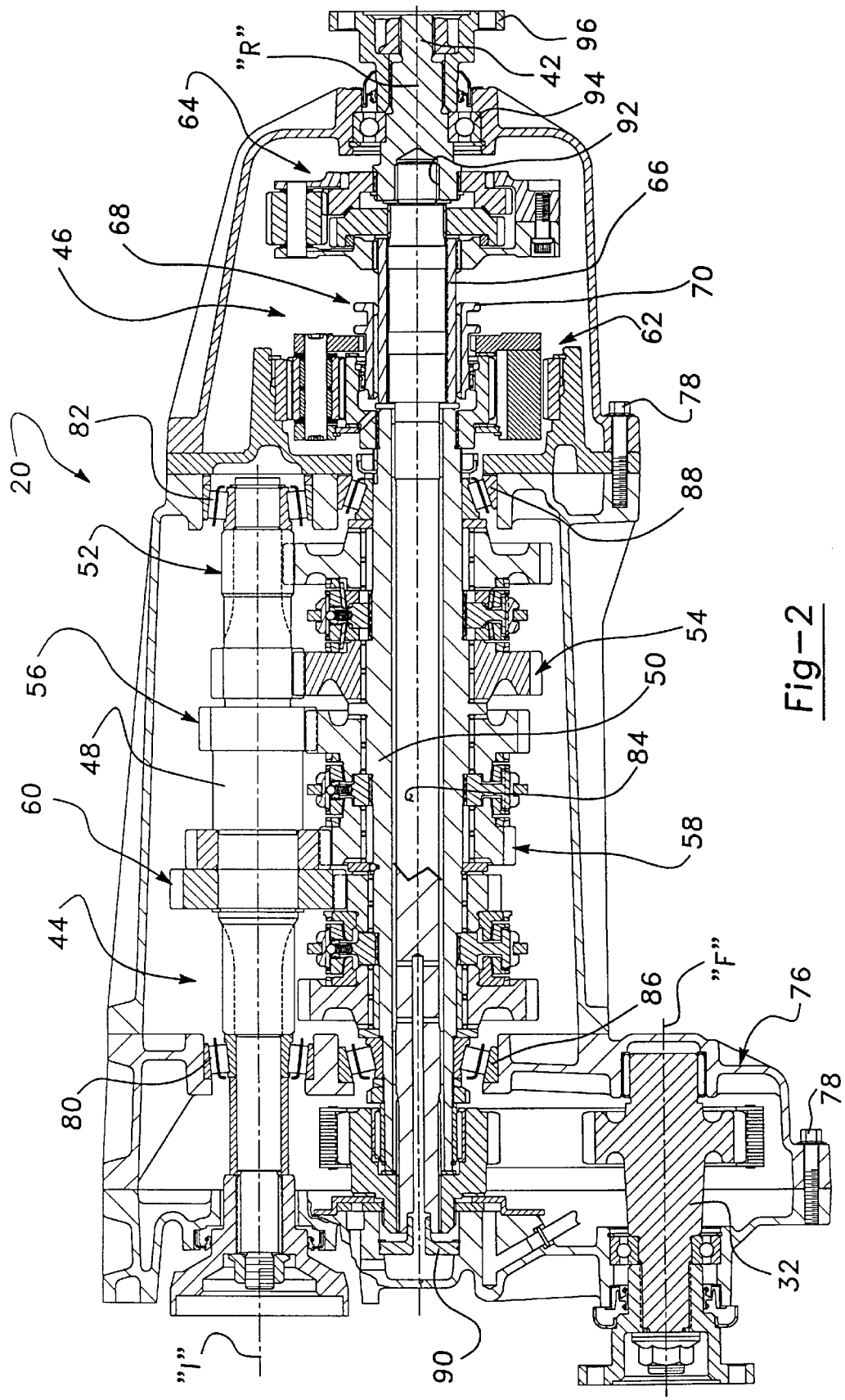
FIG. 2 is a full sectional view of the transmission constructed according to one embodiment of the present invention.
Figure 4:
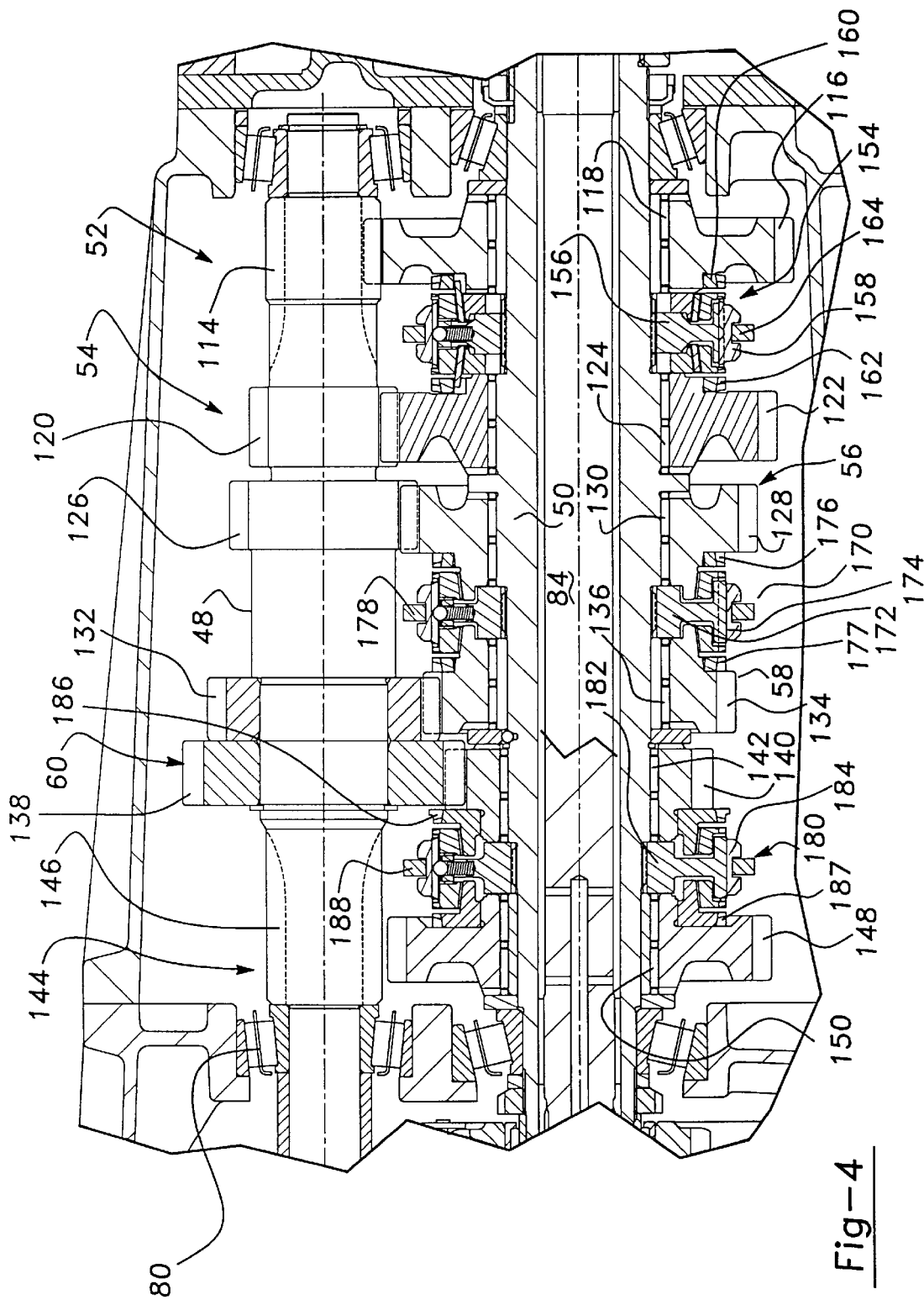

Referring to FIGS. 2 and 4, first gearset 52 is shown to include a first input gear 114 that is secured to input shaft 48 and a first speed gear 116 that is rotatably mounted on mainshaft 50 via a suitable bearing assembly 11 8. First input gear 114 and first speed gear 116 are in constant-mesh so as to define a first power transmission path from input shaft 48 to mainshaft 50 at a first speed ratio. Second gearset 54 includes a second input gear 120 that is secured to input shaft 48 and a second speed gear 122 that is rotatably mounted on mainshaft 50 via a suitable bearing assembly 124. Second input gear 120 and second speed gear 122 are in constant-mesh so as to define a second power transmission path from input shaft 48 to mainshaft 50 at a second speed ratio. Third gearset 56 includes a third input gear 126 that is fixed to input shaft 48 and a third speed gear 128 that is rotatably mounted on mainshaft 50 via a suitable bearing assembly 130. Third input gear 126 and third speed gear 128 are in constant-mesh so as to define a third power transmission path from input shaft 48 to mainshaft 50 at a third speed ratio. Fourth gearset 58 includes a fourth input gear 132 that is fixed to input shaft 48 and a fourth speed gear 134 that is rotatably mounted on mainshaft 50 via a suitable bearing assembly 136. Fourth speed gear 132 and fourth input gear 136 are in constant-mesh so as to define a fourth power transmission path at a fourth speed ratio. Fifth gearset 60 includes a fifth input gear 138 that is fixed to input shaft 48 and a fifth speed gear 140 that is rotatably supported on mainshaft 50 via bearing assembly 142. Fifth input gear 138 and fifth speed gear 140 are in constant-mesh so as to define a fifth power transmission path at a fifth speed ratio. These five gearsets are provided to establish five forward gears for transmission 20. Finally, a reverse gearset 144 is provided to reverse the rotary direction of mainshaft 50. To this end, a reverse input gear 146 is fixed to input shaft 48, a reverse speed gear 148 is rotatably supported via bearing assembly 150 on mainshaft 50, and a reverse idler gear (not shown) is in constant mesh with both of reverse input gear 146 and reverse speed gear 148. Thus, reverse gearset 144 establishes the reverse gear.

To provide means for selectively establishing the forward and reverse gears, each gearset 52, 54, 56, 58, 60 and 144 is associated with a selectively engageable synchronizer clutch for shifting between the various gears. Specifically, geartrain 44 of transmission 20 is a five-speed arrangement having three synchronizer clutch assemblies that are shifted via the vehicle operator manipulating a gearshift lever 152 (FIG. 1) in a well-known manner. To this end, a first synchronizer clutch assembly 154 is shown operably installed between first gearset 52 and second gearset 54 on mainshaft 50 and includes a hub 156 fixed for rotation with mainshaft 50 and a clutch sleeve 158 that is supported for rotation with and bi-directional axial movement on hub 156. First synchronizer clutch assembly 154 is a double-acting arrangement with each synchronizer preferably of the double-cone type, as shown. However, it is to be understood that synchronizer clutch assembly 154 (as well as each of the synchronizer clutch assemblies subsequently discussed for effecting gear changes between input shaft 48 and mainshaft 50) may be of any suitable type conventionally used in multi-speed manual transmissions.

When clutch sleeve 158 is moved rearwardly from the centered neutral position shown to its first gear position it couples first speed gear 116 to mainshaft 50, thus engaging the first power transmission path and establishing the first speed forward ratio. Such movement of clutch sleeve 158 to its first gear causes speed synchronization between mainshaft 50 and first speed gear 116, thus allowing clutch sleeve 158 to move into locked engagement with the teeth of a clutch ring 160 that is fixed to first speed gear 116. Conversely, when clutch sleeve 158 is moved forwardly from its central neutral position to its second gear position it couples second speed gear 122 to mainshaft 50, thus engaging the second power transmission path and establishing the second forward speed ratio. Movement of clutch sleeve 158 to its second gear position causes speed synchronization between mainshaft 50 and second speed gear 122, thus allowing clutch sleeve 158 to move into locked engagement with the teeth of a clutch ring 162 that is fixed to second speed gear 122. Clutch sleeve 158 is axially moveable relative to hub 156 in a well known manner by means of a first shift fork, partially shown at reference numeral 164, that is operably interconnected to gearshift lever 152 via a suitable gearshift mechanism diagrammatically shown by block 166 in FIG. 1.

A second double-acting synchronizer clutch assembly 170, preferably of the single-cone type, is shown operably installed on mainshaft 50 between third gearset 56 and fourth gearset 58. Synchronizer clutch assembly 170 includes a hub 172 fixed for rotation with mainshaft 50 and a clutch sleeve 174 that is supported for rotation with and bi-directional axial movement on hub 172. When clutch sleeve 174 is moved rearwardly from its centered neutral position shown to its third gear position it couples third speed gear 128 to mainshaft 50, thus engaging the third power transmission path and establishing the third forward speed ratio. Teeth of a clutch ring 176 fixed to third speed gear 128 are selectively engageable with clutch sleeve 174 when, following synchronization, clutch sleeve 174 is moved to its third gear position for coupling third speed gear 128 to mainshaft 50. Conversely, when clutch sleeve 174 is moved forwardly to its fourth gear position it couples fourth speed gear 134 to mainshaft 50 for engaging the fourth power transmission path and establishing the fourth speed ratio. Teeth of a clutch ring 177 fixed to fourth speed gear 134 are selectively engageable with clutch sleeve 174 when, following synchronization, clutch sleeve 174 is moved to its fourth gear position for coupling fourth speed gear 134 to mainshaft 50. Clutch sleeve 174 is axially movable between its third and fourth gear positions by means of a second shift fork, partially shown at 178, that is also coupled to gearshift mechanism 166.

A third double-acting synchronizer clutch assembly 180, also preferably of the single-cone type, includes a hub 182 that is fixed for rotation with mainshaft 50. A clutch sleeve 184 is meshed for rotation with and axial movement on hub 182. Rearward movement of clutch sleeve 184 from its centered neutral position shown to its fifth gear position causes clutch sleeve 184 to engage teeth of a clutch ring 186 fixed to fifth speed gear 140 for coupling fifth gearset 60 to mainshaft 50 to engage the fifth power transmission path and establish the fifth forward speed ratio. Finally, clutch sleeve 184 is moved to its reverse gear position whereat it engages teeth on clutch ring 187 in response to shifting of geartrain 44 into its reverse gear for coupling reverse speed gear 148 of gearset 144 to mainshaft 50. Clutch sleeve 184 is axially moveable between its fifth gear and reverse gear positions by means of a third shift fork, partially shown at 188, that is also connected to gearshift mechanism 166.

Figure 5:
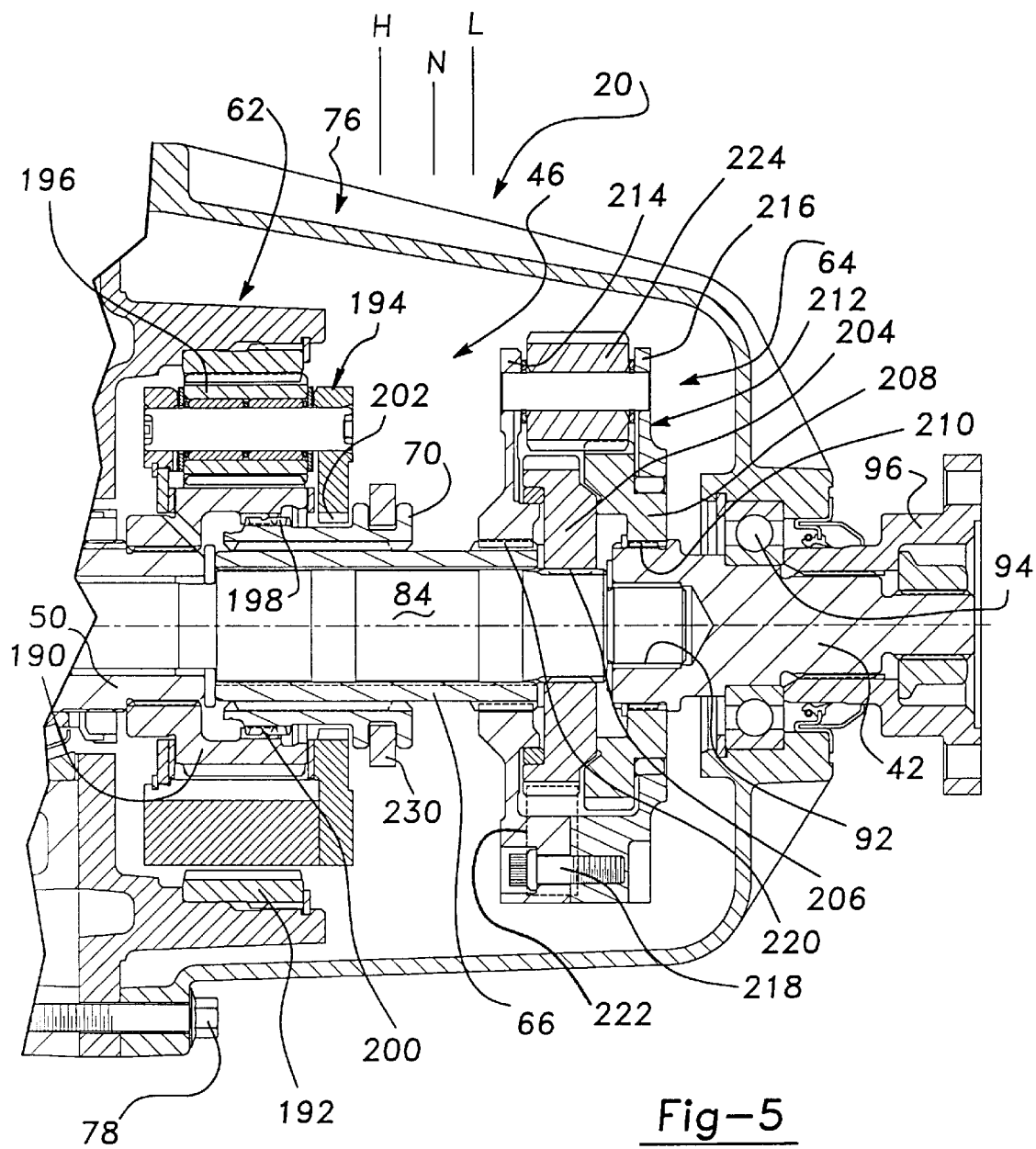

As noted, drive torque delivered via geartrain 44 to mainshaft 50 is transferred by power transfer arrangement 46 to output shafts 32 and 42. In operation, gear reduction unit 62 is adapted to selectively connect quill shaft 66 to mainshaft 50 for driven rotation at either of a direct or a reduced speed ratio. To this end, FIG. 5 shows gear reduction unit 62 to be a planetary gearset having a sun gear 190 fixed to mainshaft 50, a ring gear 192 fixed to housing 76, and a planet carrier 194 rotatably supporting a plurality of pinion gears 196 that are in constant mesh with both sun gear 190 and ring gear 192. As such, sun gear 190 is directly driven by mainshaft 50 while planet carrier 194 is driven at a reduced speed ratio relative thereto. Range clutch 70 is splined to quill shaft 66 for rotation therewith and sliding axial movement thereon. Range clutch 70 is movable between three distinct positions for establishing the high-range drive mode, the low-range drive mode, and the neutral non-driven mode. In particular, movement of range clutch 70 to its high-range position shown, as denoted by construction line "H", causes clutch teeth 198 on range clutch 70 to mesh with clutch teeth 200 on sun gear 190, thereby establishing the direct speed ratio (i.e., high-range) connection between mainshaft 50 and quill shaft 66. Likewise, rearward movement of range clutch 70 to its low-range position, as denoted by construction line "L", causes its clutch teeth 198 to engage clutch teeth 202 on planet carrier 194, thereby establishing the reduced speed ratio (i.e., low-range) connection between mainshaft 50 and quill shaft 66. Finally, movement of range clutch 70 to its central position, as denoted by construction line "N", disconnects quill shaft 66 from driven connection with mainshaft 50 for establishing the neutral non-driven mode.

To provide means for establishing the full-time (i.e., differentiated) four-wheel drive mode in which drive torque is delivered to both front driveline 12 and rear driveline 14, transmission 20 is equipped with interaxle differential 64 having its input member driven by quill shaft 66 and its output members driving or being driven by front and rear output shafts 32 and 42, respectively. With continued reference to FIG. 5, interaxle differential 64 is shown to be a dual-planetary gearset including a first sun gear 204 secured by a splined connection 206 to the aft end of transfer shaft 84, a second sun gear 208 fixed via a splined connection 210 to rear output shaft 42, and a planet carrier 212 rotatably interconnecting quill shaft 66 to sun gears 204 and 208. In particular, planet carrier 212 includes a first carrier ring 214 and a second carrier ring 216 interconnected by fasteners 218. First carrier ring 214 is shown to be coupled via a splined connection 220 to quill shaft 66. A set of first or half-length planet gears 222 are rotatably supported between carrier ring 214 and 216 and mesh with first sun gear 204. A set of second or full-length planet gears 224 are rotatably supported between carrier rings 214 and 216 and mesh with second sun gear 208. Moreover, each one of first planet gears 222 is meshed with one of second planet gears 224 such that they are arranged as meshed pairs around the circumference of planet carrier 212. Thus, when range clutch 70 is located in its "H" position, the full-time four-wheel high-range drive mode is established. Likewise, when range clutch 70 is located in its "L" position, the full-time four-wheel low-range drive mode is established. Finally, when range clutch 70 is in its "N" position, quill shaft 66 is uncoupled from mainshaft 50, whereby no drive torque is delivered to front and rear output shafts 32 and 42, respectively, through interaxle differential 64. As will be understood, the specific gear geometry associated with the intermeshed gears of interaxle differential 64 will determine the torque distribution ratio between front output shaft 32 and rear output shaft 42.

Figure 6:
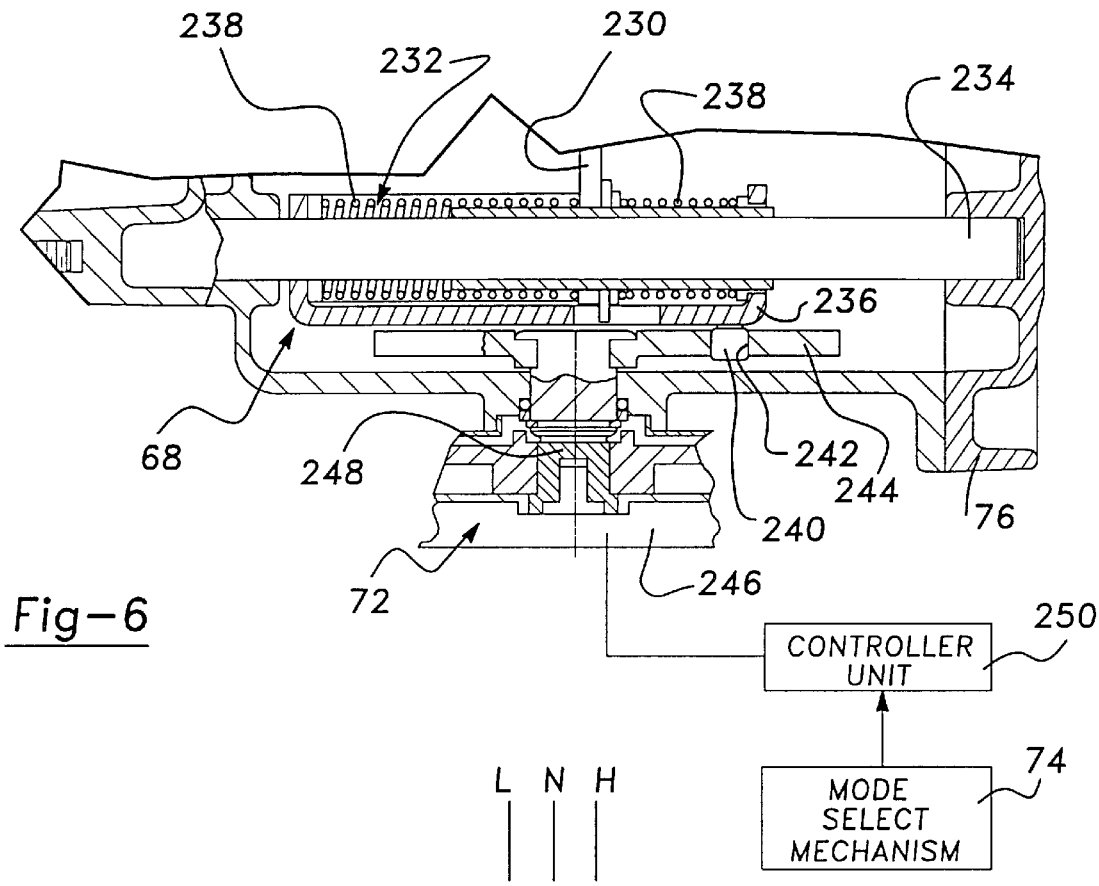
FIG. 6 is a partial sectional view of the transmission showing components of the range shift mechanism.

To provide means for moving range clutch 70 between its three distinct positions, range shift mechanism 68 is shown in FIG. 6 to include a range fork 230 that is coupled to range clutch 70 and a spring-biased apparatus 232 for axially moving range fork 230. Spring-biased apparatus 232 is mounted on a shift rail 234 secured to housing 76 and includes a bracket 236 slidably mounted on rail 234 and a pair of springs 238. Springs 238 act between bracket 236 and range fork 230 for applying directional biasing loads on range fork 230. This arrangement is adapted to bias range fork 230 for ensuring movement of range clutch 70 to either of its fully meshed "L" or "H" positions. A range pin 240 is secured to bracket 236 and extends into a range slot 242 formed in a sector plate 244. The contour of range slot 242 is designed to control the amount and direction of axial movement of bracket 236 and range fork 230 in response to the amount and direction of rotation of sector plate 244. In the particular embodiment shown, shift actuator 72 is an electric gearmotor/encoder assembly 246 having a rotary output shaft 248 that is coupled to sector plate 244. Thus, gearmotor/encoder assembly 246 is operable to controllably rotate sector plate 244, in either direction, between positions corresponding to the three positions of range clutch 70 in response to control signals sent to gearmotor/encoder assembly 246 from a remote controller unit, diagrammatically shown by block 250. Controller unit 250 generates the control signals in response to the mode signals delivered thereto upon the vehicle operator actuating mode select mechanism 74 which, in this case, includes appropriate switches or push-buttons that are mounted in the vehicle's passenger compartment. Preferably, controller unit 250 also receives other signals, such as vehicle speed, to control the specific operating parameter during which range shifts are permitted. In a manually-operated alternative version, shift actuator 72 would include a mechanical linkage assembly operable for rotating sector plate 244 and mode select mechanism 74 would include a manually-operable shift lever.

Figure 7:
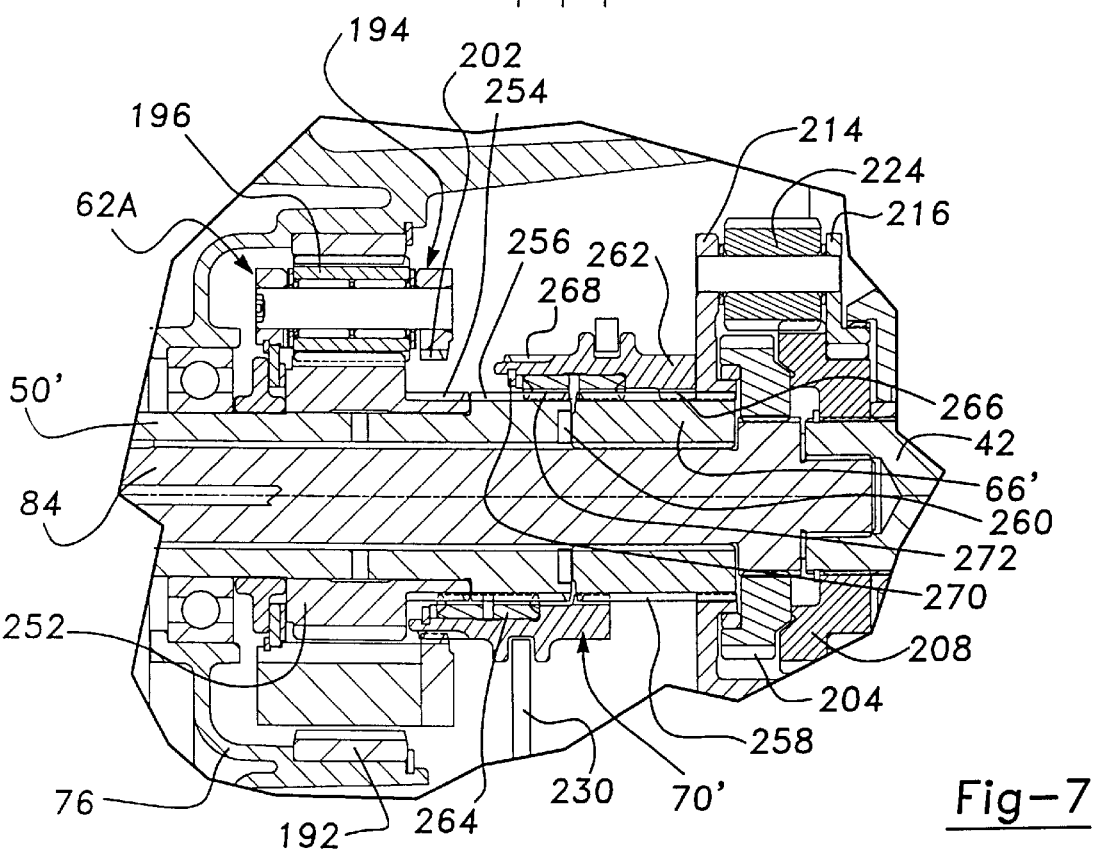
FIG. 7 is a partial view of the transmission equipped with an alternative gear reduction unit and range clutch.

Referring to FIG. 7, an alternative construction for gear reduction unit 62 is shown by reference numeral 62A. For clarity, common reference numerals are used to identify similar components while primed reference numeral are used to designate those components that have been modified to incorporate gear reduction unit 62A into transmission 20. In general, gear reduction unit 62A is adapted for use in substitution for gear reduction unit 62. In particular, gear reduction unit 62A includes a sun gear 252 rotatably supported on mainshaft 50' having external clutch teeth 254 formed thereon that are alignable with clutch teeth 256 formed on mainshaft 50'. Quill shaft 66' is rotatably supported on transfer shaft 84 and has external clutch teeth 258 formed thereon that are located adjacent to, and are alignable with, mainshaft clutch teeth 256. A radial bearing assembly 260 is disposed between mainshaft 50' and quill shaft 66' to facilitate relative rotation therebetween. Gear reduction unit 62A also includes a ring gear 192 that is fixed to housing 76 so as to be held stationary relative thereto. A plurality of pinion gears 196 (only one shown) are each rotatably supported between the front and rear carrier rings of planet carrier 194. Pinion gears 196 mesh with sun gear 252 and ring gear 192.

Range clutch 70' includes a pair of sleeves 262 and 264 that are selectively engageable with one or more of sun gear 252, mainshaft 50' and quill shaft 66' for establishing the two different drive connections therebetween. In particular, outer sleeve 262 has internal clutch teeth 266 that are in constant meshed engagement with clutch teeth 258 on quill shaft 66'. Likewise, outer sleeve 262 has external clutch teeth 268 formed on a drum-like axial extension thereof that are selectively engageable with clutch teeth 202 on planet carrier 194. Inner sleeve 264 is rotatably supported against an inner bearing surface formed in the axial extension portion of outer sleeve 262 and is retained relative thereto by a snap ring 270. Inner sleeve 264 includes internal clutch teeth 272 that continuously mesh with external teeth 256 of mainshaft 50' and which are also selectively engageable with either sun gear clutch teeth 254 or quill shaft clutch teeth 258 depending on the axial position of range clutch 70'.

Due to the meshed connection between outer sleeve 262 and quill shaft 66' and the meshed connection between inner sleeve 264 and mainshaft 50', range clutch 70' can be axially slid between a low-range position ("L"), a neutral position ("N"), and a high-range position ("H"). When range clutch 70' is positioned in its "L" position, as shown in the lower half of FIG. 7, clutch teeth 272 of inner sleeve 264 engage both sun gear clutch teeth 254 and mainshaft clutch teeth 256. In addition, external clutch teeth 268 on outer sleeve 262 engage planet carrier clutch teeth 202 while its internal clutch teeth 266 engage quill shaft clutch teeth 258. As such, inner sleeve 264 couples sun gear 252 for common rotation with mainshaft 50'. Thus, sun gear 252 drives pinion gears 196 around ring gear 192 such that planet carrier 194 is driven at a reduced speed ratio relative to mainshaft 50'. Moreover, due to the connection of planet carrier 194 to quill shaft 66' via outer sleeve 262 of range clutch 70', quill shaft 66' is also driven at the reduced speed ratio relative to mainshaft 50' for establishing the low-range drive connection therebetween. When range clutch 70' is moved from its low-range position into its neutral position, clutch teeth 272 of inner sleeve 264 are de-coupled from sun gear teeth 254 and only engage mainshaft teeth 256. Moreover, clutch teeth 268 on outer sleeve 262 are uncoupled from planet carrier teeth 202 while its internal clutch teeth 266 only engage quill shaft teeth 258. In this neutral position, inner sleeve 264 is free to rotate relative to outer sleeve 262. As such, there is no drive connection between mainshaft 50' and quill shaft 66', whereby the neutral non-driven mode is established. Finally, when range clutch 70' is moved from its neutral position to its high-range position, as shown in the upper half of FIG. 7, a direct connection is established between quill shaft 66' and mainshaft 50'. Specifically, outer sleeve 262 is uncoupled from planet carrier 194 and its clutch teeth 266 are maintained in engagement with quill shaft teeth 258. Moreover, clutch teeth 272 of inner sleeve 264 mesh with mainshaft teeth 256 and quill shaft teeth 258 so as to directly couple quill shaft 66' to mainshaft 50' for common rotation, thereby establishing the high-range drive connection therebetween. As before, range fork 230 is coupled to range clutch 70' for controlling axial movement thereof. It is contemplated that a range shift mechanism similar to that disclosed in FIG. 6 would be used with the contour of range slot 242 controlling movement of range fork 230 in response to rotation of sector plate 244 via actuation of gearmotor 246.

Figure 8:
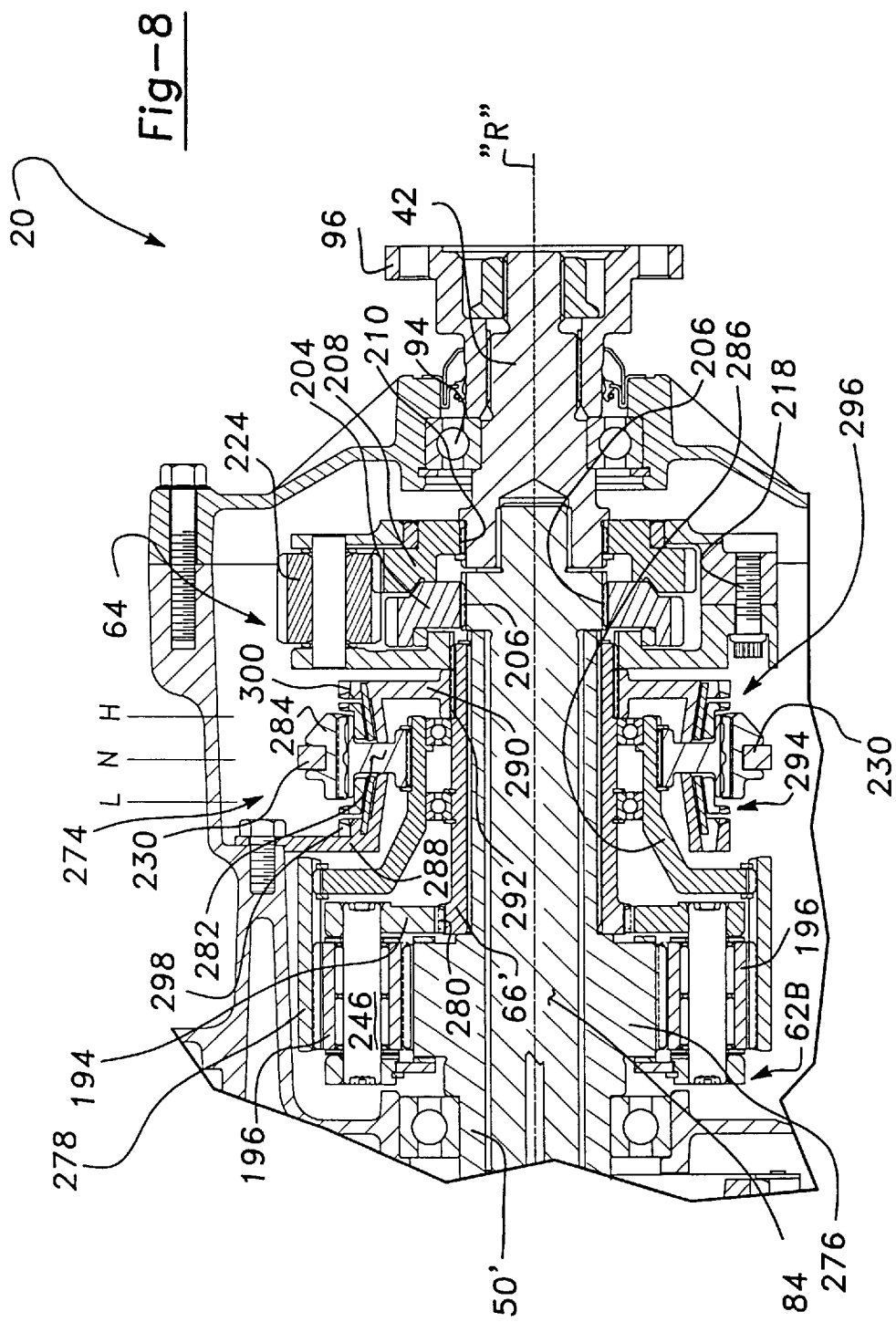
FIG. 8 is a partial view of the transmission equipped with yet another gear reduction unit and a synchronized range shift mechanism.

Referring to FIG. 8, transmission 20 is shown again alternatively equipped with a gear reduction unit 62B and a synchronized range shift mechanism 274 that permits "on-the-fly" shifting between the four-wheel high-range and low-range drive modes. As schematically shown, gear reduction unit 62B is a planetary gear assembly having a sun gear 276 rotatably driven by mainshaft 50', a ring gear 278, and a planet carrier 194 having a plurality of planet gears 196 rotatably supported therefrom that mesh with sun gear 276 and ring gear 278. Planet carrier 194 is coupled via a splined connection 280 for rotation with quill shaft 66'. Shift mechanism 274 includes a bi-directional clutch apparatus having a clutch hub 282 fixed for rotation with ring gear 278, and a range clutch 284 supported for rotation with and axial sliding movement on clutch hub 282. As seen, a bell-shaped reaction member 286 is provided for coupling clutch hub 282 to ring gear 278. Range clutch 284 is movable between its centered neutral (N) position shown to either a low-range (L) position or a high-range (H) position. In particular, when moved to its low-range position, range clutch 284 couples clutch hub 282 to a stationary brake plate 288 fixed to housing 76. As such, ring gear 278 is held stationary such that planet carrier 194 rotates at a reduced speed ratio relative to mainshaft 50' for establishing the low-range drive connection between mainshaft 50' and quill shaft 66'. Range clutch 284 can further be moved to its high-range position whereat it couples clutch hub 282 to a clutch plate 290 that is secured via a splined connection 292 to quill shaft 66'. As such, range clutch 284 couples ring gear 278 for common rotation with planet carrier 194. Thus, sun gear 276, planet gears 196 and ring gear 278 are effectively locked together so as to rotate as a common unit for directly transferring drive torque from mainshaft 50' to quill shaft 66'. With range clutch 284 positioned in its neutral position, ring gear 278 is uncoupled from brake plate 288 and clutch plate 290. As such, rotation of mainshaft 50' causes sun gear 276 to rotate which, in turn, causes planet gears 196 to rotate about their respective pinion shaft which, in turn, causes ring gear 278 to be rotatably driven. As a result, planet carrier 194 is not rotatably driven in response to rotation of sun gear 276, whereby quill shaft 66' is maintained in a non-driven status.

To provide means for shifting clutch sleeve 284 on-the-fly between its three distinct positions, range clutch 284 is coupled to range fork 230. Moreover, synchronized shift mechanism 274 includes a first synchronizer 294 operably located between clutch hub 282 and brake plate 288, and a second synchronizer 296 operably located between clutch hub 282 and clutch plate 290. First synchronizer 294 is operable for causing speed synchronization between ring gear 278 and brake plate 288 upon movement of range clutch 284 towards its low-range position and for completing such speed synchronization therebetween prior to range clutch 284 being coupled to clutch teeth 298 on brake plate 288. In a like manner, second synchronizer assembly 296 is operable for causing speed synchronization between ring gear 278 and planet carrier 194 in response to movement of range clutch 284 toward its high-range position and for completing such speed synchronization therebetween prior to range clutch 284 entering into coupled engagement with clutch teeth 300 on clutch plate 290. It is contemplated that synchronizers 294 and 296 can be any suitable synchronizer clutch apparatus known in the art for facilitating speed synchronization between relatively rotatable components.

Figure 9:
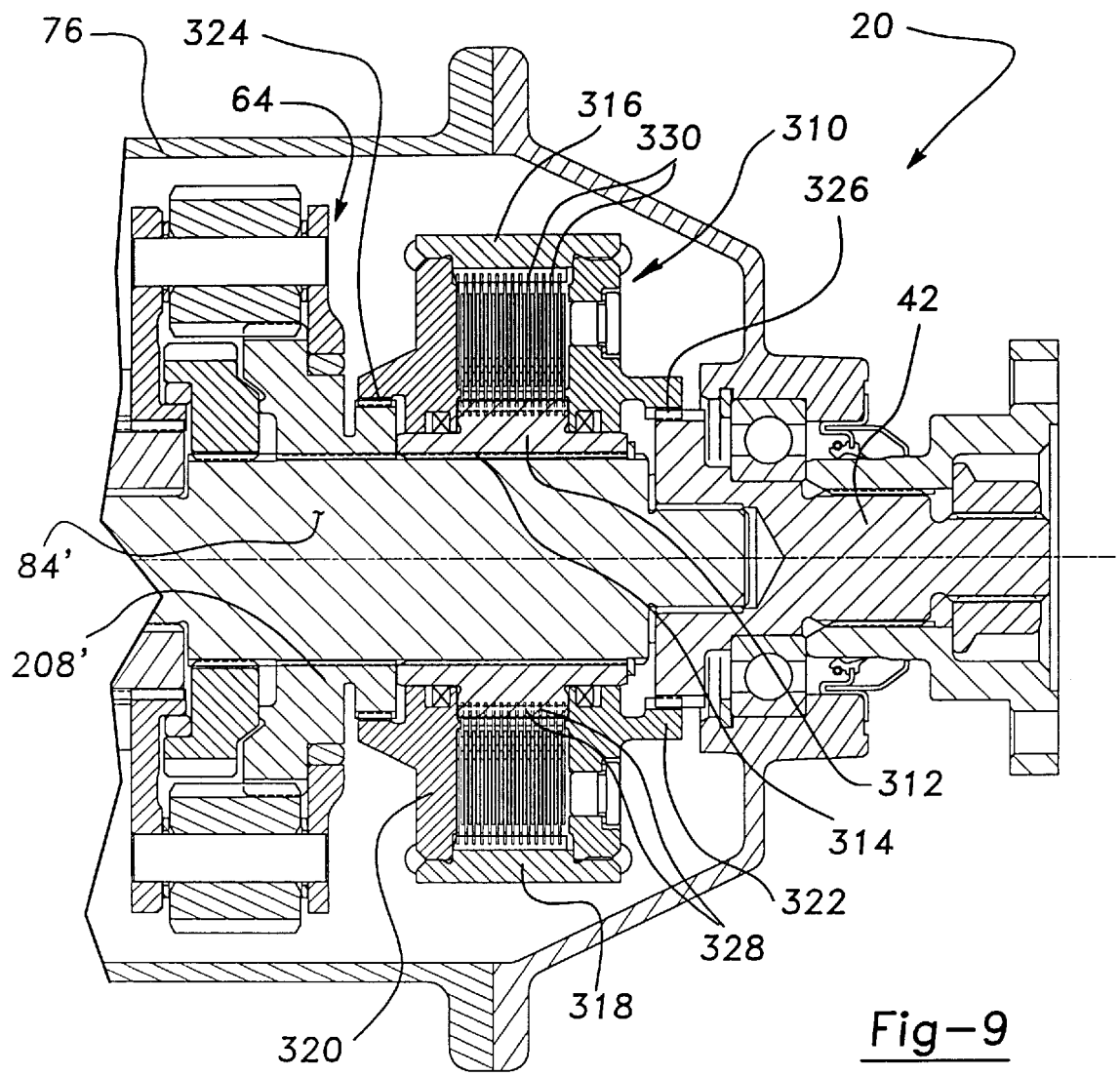
FIG. 9 is a partial sectional view showing the transmission equipped with a torque transfer apparatus for automatically controlling speed differentiation and torque biasing across the interaxle differential.

Referring to FIG. 9, transmission 20 is shown in another modified version in which a torque transfer apparatus 310 has been operably installed for automatically controlling the torque biasing across interaxle differential 64 in response to speed differentials (i.e., interaxle slip) between front output shaft 32 and rear output shaft 42. Again, since many of the components shown in FIG. 9 are identical to those previously described, those that have been modified are now identified with a primed reference numeral. According to the particular embodiment shown, torque transfer apparatus 310 is a viscous coupling having an inner drum 312 fixed via a splined connection 314 to transfer shaft 84' and a cover assembly 316 supported and sealed relative to inner drum 312 for rotation relative thereto. In particular, cover assembly 316 includes an outer drum 318 to which a front end plate 320 and a rear end plate 322 are secured. Front end plate 320 is shown to be fixed via a splined connection 324 for rotation with second sun gear 208' of interaxle differential 64. Second sun gear 208' is shown to be journally supported on transfer shaft 84'. In addition, rear end plate 322 is shown to be fixed via a splined connection 326 to rear output shaft 42. A clutch pack is retained within the sealed chamber formed between cover assembly 316 and inner drum 312 and includes a set of inner clutch plates 328 secured for rotation with inner drum 312 and a set of outer clutch plates 330 secured for rotation with outer drum 318. Inner and outer clutch plates 328 and 330 are alternately interleaved and the sealed chamber is filled with a predetermined volume of a viscous fluid.

Since viscous coupling 310 is a speed-dependent device, increasing relative rotation between outer drum 318 and inner drum 312 results in the shearing of the viscous fluid within the sealed chamber for transferring torque through the interleaved clutch pack to the slower rotating component, thereby automatically biasing the drive torque transferred across interaxle differential 64. Thus, the torque biasing is on-demand and progressive based on the interaxle speed difference across viscous coupling 310. Commonly-owned U.S. Pat. No. 5,148,900 describes the operation of such a viscous coupling in more detail and is hereby expressly incorporated by reference. Furthermore, it is contemplated that other on-demand torque transfer apparatus can be substituted for the viscous coupling. For example, commonly-owned U.S. Pat. No. 5,456,642 to Frost discloses a geared traction unit which could easily be adapted for use in transmission 20 as a slip limiting device. Thus, it is contemplated that any self-contained on-demand apparatus currently known in the power transmission art for progressively transferring drive torque due to speed differentials is an equivalent device to viscous coupling 310.

Figure 10:
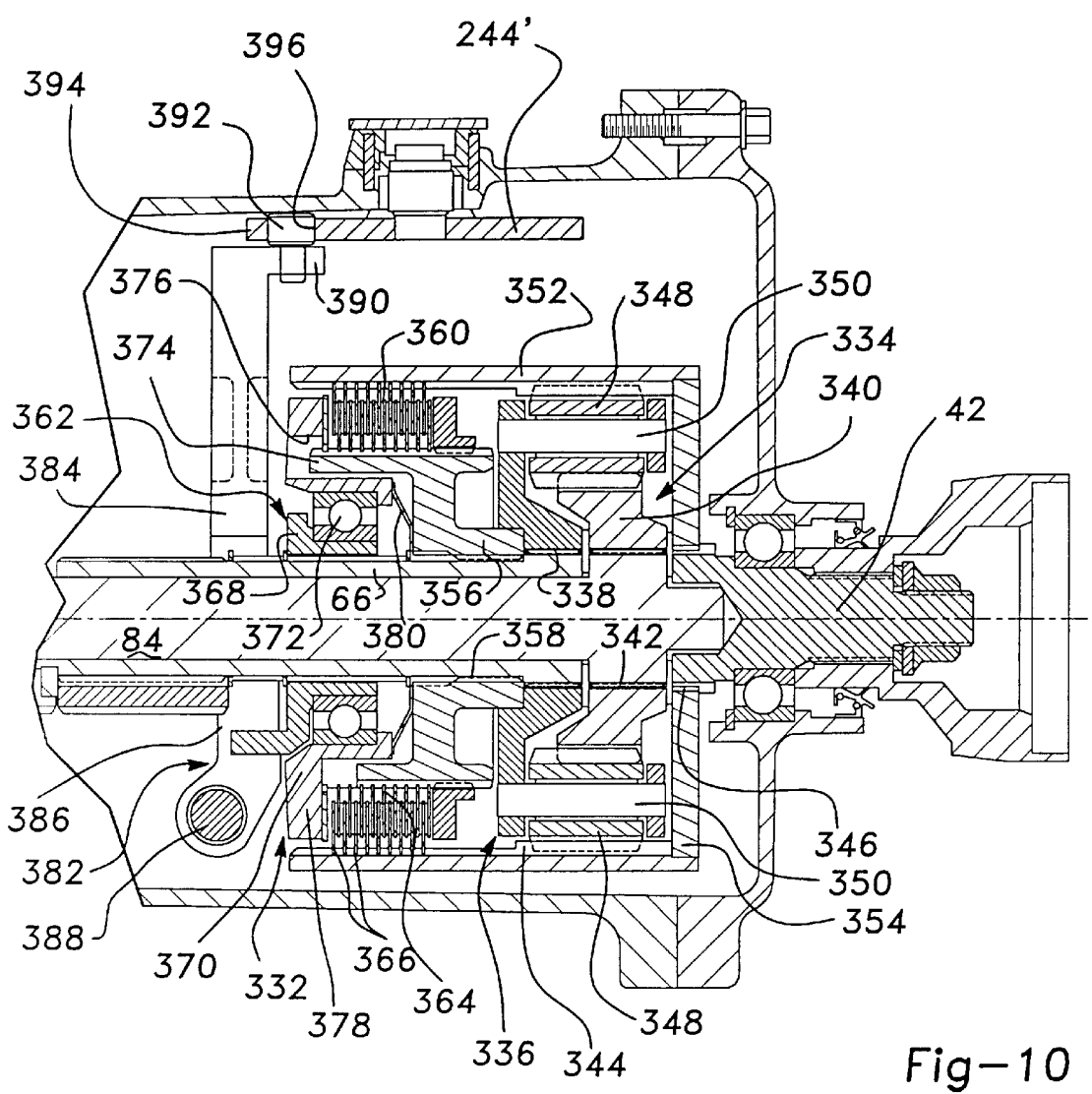
FIG. 10 is a partial sectional view showing an alternative interaxle differential and an electronically-controlled torque transfer clutch for use in the transmission.

With particular reference now to FIG. 10, another partial view of transmission 20 is shown to be alternatively equipped with an electronically-controlled torque transfer apparatus, hereinafter referred to as transfer clutch 332, which is operable for controlling speed differentiation and torque biasing across an interaxle differential 334. Interaxle differential 334 includes a planet carrier 336 fixed via a splined connection 338 to quill shaft 66, a sun gear 340 fixed via a splined connection 342 to transfer shaft 84, and a ring gear 344 fixed via a splined connection 346 to rear output shaft 42. Planet carrier 336 supports a plurality of pinion gears 348 journally supported on shafts 350 and which mesh with ring gear 344 and sun gear 340. Ring gear 344 is formed as part of an outer drum assembly including an outer drum 352 and an end plate 354. End plate 354 is fixed to outer drum 352 and is coupled to rear output shaft 42 via splined connection 346. As such, driven rotation of planet carrier 336 causes torque to be distributed between rear output shaft 42 and front output shaft 32 (via transfer shaft 84) at a ratio determined by the gear geometry of the intermeshed components.

To provide means for biasing the torque across interaxle differential 334, transfer clutch 332 is shown to be operatively arranged between quill shaft 66 and rear output shaft 42. In particular, transfer clutch 332 includes an inner clutch hub 356 fixed via a splined connection 358 to quill shaft 66, a clutch pack 360 extending between clutch hub 356 and outer drum 352, and a thrust mechanism 362 for applying a compressive clutch engagement force on clutch pack 360. Clutch pack 360 includes a series of inner clutch plates 364 fixed to clutch hub 356 and that are alternately interleaved with a series of outer clutch plates 366 fixed to outer drum 352. Thrust mechanism 362 is slidably supported on quill shaft 66 and includes an inner bearing support 368 rotatably supported on quill shaft 66, an outer bearing support 370 coupled for rotation with inner clutch hub 356, and a thrust bearing assembly 372 retained therebetween. As seen, an axially-extending end segment 374 of inner clutch hub 356 is retained in an aperture 376 formed in outer bearing support 370. Outer bearing support 370 includes a radially-extending plate segment 378 which, upon axial sliding movement of thrust mechanism 362 applies the clutch engagement force to clutch pack 360. A return spring 380 is arranged to normally bias thrust mechanism 362 in a direction to oppose application of the clutch engagement force to clutch pack 360.

In the embodiment shown, shift actuator 72 serves the dual purpose of controlling axial movement of range clutch 70, 70' or 284 between its three distinct range positions as well as controlling pivotal movement of a lever assembly 382 to control the magnitude of the clutch engagement force exerted on clutch pack 360. Lever assembly 382 includes an elongated lever arm 384 having a bifurcated end segment 386 surrounding quill shaft 66 that pivotably supported on a rail 388 retained in housing 76 and a flanged end segment 390. Lever assembly 382 also includes a crowned roller 392 that is mounted by a pin 394 on flanged segment 390 of lever arm 384. Crowned roller 392 is retained in a mode slot 396 formed in sector plate 244'. In general, the contour of mode slot 396 is configured to control the direction and amount of pivotal movement of lever arm 384 in response to the direction and amount of rotation of sector plate 244' for controlling the magnitude of the clutch engagement force exerted on clutch pack 360. While not shown, buttons on bifurcated segment 386 of lever arm 384 engage inner bearing support 368 for causing axial sliding movement of thrust mechanism 362 in response to pivotal movement of lever arm 384. As seen, flanges 398 extending from inner bearing support 368 engage lever arm 384 so as to inhibit rotation of inner bearing support 368.

Figure 11:
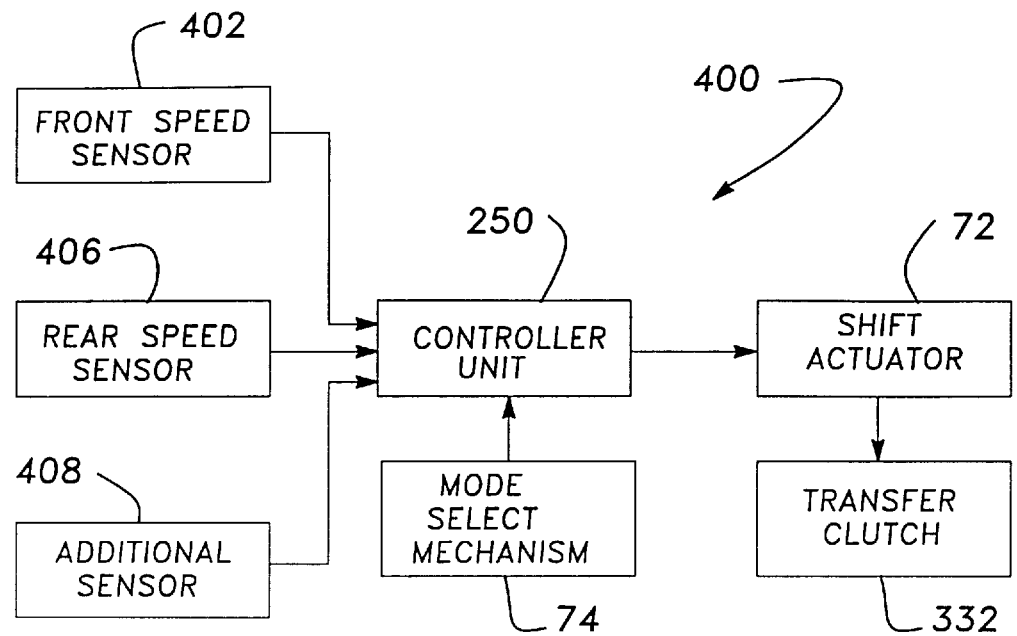
FIG. 11 is a block diagram for an electronically-controlled transfer clutch adapted for use with the full-time 4WD transmission of FIGS. 2 through 9 and the on-demand 4WD transmission of FIG. 10.

To control the clutch engagement force generated by transfer clutch 332 and, in turn, the torque biasing across interaxle differential 334, shift actuator 72 is used in conjunction with an electronically-controlled power transfer system 400. Power transfer system 400 is illustrated as a block diagram in FIG. 11. In its most basic form, power transfer system 400 includes a front speed sensor 402 for measuring the rotational speed of front output shaft 32 (or transfer shaft 84 or front prop shaft 30), a rear speed sensor 400 for measuring the rotational speed of rear output shaft 42 (or rear prop shaft 40) and controller unit 250. Speed signals from sensors 402 and 404 are deliver to controller 250 which determines a speed differential signal based thereon. If the speed differential signals exceeds a predetermined threshold value, controller 250 actuates gearmotor/encoder 246 for applying a clutch engagement force on clutch pack 360, thereby transferring drive torque to the slower turning one of output shafts 32 and 42. The threshold value can be stored in look-up tables or calculated from stored algorithms. Actuation of gearmotor/encoder 246 can be either of the ON/OFF type or the ADAPTIVE type. Under the ON/OFF control scheme, transfer clutch 332 is normally maintained in a non-actuated state but is shifted into its fully-actuated state when the speed differential signal exceeds the threshold value. Once the speed differential signal is reduced to a magnitude less than the predetermined threshold value, transfer clutch 332 is returned to its non-actuated state. With transfer clutch 332 in its non-Attorney actuated state, speed differentiation across interaxle differential is permitted. However, when transfer clutch 332 is fully-actuated, relative rotation across interaxle differential 334 is inhibited. Under the ADAPTIVE control scheme, the magnitude of the clutch engagement force is varied as a function of changes in the magnitude of the speed differential signal to progressively control the actuated condition of transfer clutch 332 between its non-actuated and fully-actuated states. As such, the biasing across interaxle differential 334 can be continuously modulated. Additional sensor input signals, accumatively shown by block 408, can also be inputted to controller 250 for modifying the vehicle operating parameters under which transfer clutch 332 is controlled. These sensors could include a vehicle speed sensor, a brake sensor, an acceleration sensor, and the like. An ADAPTIVE control system suitable for use with the present invention is disclosed in commonly-owned U.S. Pat. No. 5,411,110, the entire disclosure which is incorporated by reference.

As a further option, due to use of mode select mechanism 74, the vehicle operator is permitted to select one of an AUTOMATIC mode and a LOCKED mode. In the AUTOMATIC mode, transfer clutch 332 is controllably actuated, pursuant to either of the ON/OFF or ADAPTIVE control schemes described above, without any further input required from the vehicle operator. Thus, the vehicle operator can select between the full-time high-range and low-range drive modes with any torque biasing across interaxle differential 334 being controlled automatically ("on-demand") so as to be transparent to the vehicle operator. However, when the LOCKED drive mode is selected, transfer clutch 332 is intentionally shifted and held in its fully-actuated state to lock-up interaxle differential 334 for delivering non-differentiated drive to output shafts 32 and 42. The LOCKED mode is provided for permitting improved traction when the motor vehicle is being operated off-road or on severe road conditions. In the LOCKED mode, transmission 20 is capable of permitting the vehicle operator to select a part-time (i.e., non-differentiated) four-wheel high-range or low-range drive mode. Thus, transmission 20 is capable of providing five different distinct drive modes from which the vehicle operator can potentially select via mode select mechanism 74. Obviously, the number of different drive modes made available can be selected to suit each particular vehicular application. It should be understood, that the contour of mode slot 396 and range slot 242 are engineered such that transfer clutch 332 is normally operating in its non-actuated state during range shifting to eliminate the possibility of overloading of transfer clutch 332. Thus, the clutch engagement force can be controllably modulated between the non-actuated and fully-actuated states of transfer clutch 332 when the gear reduction unit has established either the high-range or low-range drive modes.

Figure 12:
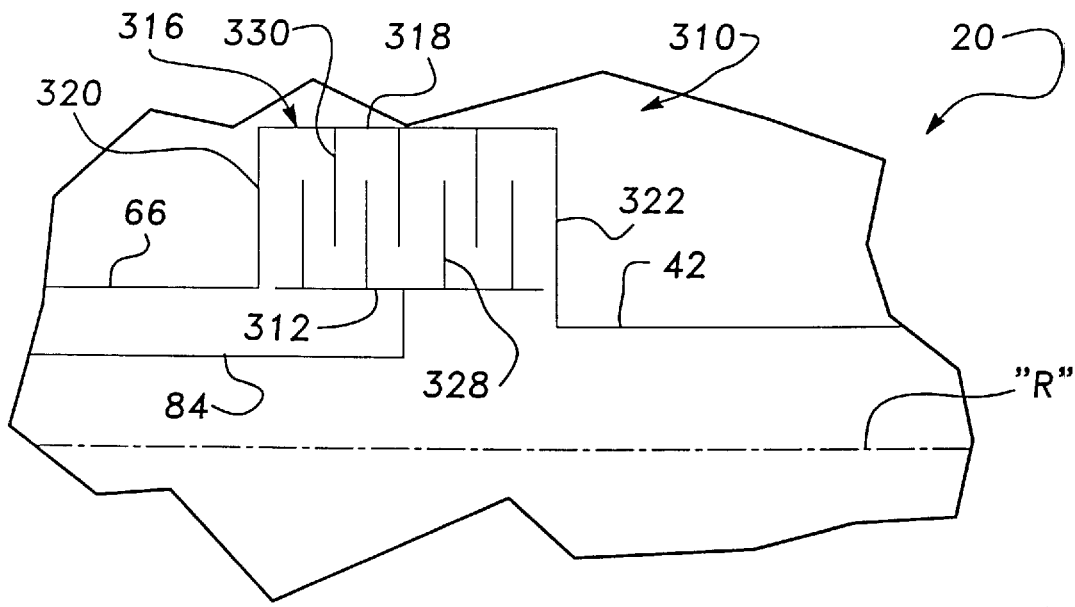
FIG. 12 is a partial schematic illustration of an on-demand 4WD arrangement for the transmission of the present invention.

Referring now to FIG. 12, a partial schematic view of an alternative construction for transmission 20 is shown. In general, the modified construction removes the interaxle differential and arranges viscous coupling 310 between transfer shaft 84 and rear output shaft 42 for providing an "on-demand" 4WD power transfer system. Viscous coupling 310 is again disclosed as having an inner drum 312 fixed for rotation with transfer shaft 84, a cover assembly 316 enclosing and sealed relative to inner drum 312, and a clutch pack of interleaved friction clutch plates 328 and 330. Cover assembly 316 includes an outer drum 318, a front end plate 320 that is secured to outer drum 318 and coupled to quill shaft 66, and a rear end plate 322 also secured to outer drum 318 and which is coupled to rear output shaft 42. Thus, cover assembly 318 is arranged to directly transfer drive torque from quill shaft 66 to rear output shaft 42. In operation, drive torque is normally delivered only to rear output shaft 42, thereby establishing a two-wheel drive mode. However, when traction loss at rear wheels 34 causes rear output shaft 42 to overrun front output shaft 32, viscous coupling 310 is operative to automatically transfer drive torque to transfer shaft 84 and thus to front output shaft 32 for establishing an "on-demand" four-wheel drive mode. As will be appreciated, the progressive torque transmission characteristics of the viscous coupling can be "tuned" for each particular vehicular application to determine at what value of speed difference that torque transmission will occur. While not shown, it is obvious that a modified version of the viscous coupling could be arranged to normally transfer drive torque to transfer shaft 84 with torque delivered on-demand to rear output shaft 42, if so desired. An electronically-controlled transfer clutch, similar to transfer clutch 332, could also be used in substitution for viscous coupling 310 to control on-demand four-wheel drive operation under either the ON/OFF or ADAPTIVE control schemes and the AUTOMATIC or LOCKED modes discussed above.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transmission for a four-wheel drive vehicle having an engine and front and rear drivelines, said transmission comprising:

an input shaft driven by the engine about a first rotary axis;

a mainshaft supported for rotation about a second rotary axis;

a gear reduction unit including a sun gear rotatably supported on said mainshaft, a non-rotatable ring gear, and a planet carrier having pinion gears meshed with said ring gear and said sun gear;

constant-mesh gearsets supported between said input shaft and said mainshaft;

synchronizer clutches for selectively engaging said gearsets for driving said mainshaft at speed ratios relative to said input shaft for establishing forward gears and a reverse gear;

a rear output shaft adapted for connection to the rear driveline and which is commonly aligned with said mainshaft for rotation about said second rotary axis;

a front output shaft adapted for connection to the front driveline and which is supported for rotation about a third rotary axis;

an interaxle differential for permitting speed differentiation between said rear output shaft and said front output shaft, said interaxle differential including an input member driven by said mainshaft, a first output member fixed for rotation with said rear output shaft, and a second output member;

a range clutch operable in a first position to couple said input member of said interaxle differential to said mainshaft for establishing a direct speed ratio drive connection, and said range clutch is further operable in a second position to couple said sun gear to said mainshaft and said planet carrier to said input member of said interaxle differential for establishing a reduced speed ratio drive connection; and a transfer mechanism connecting said front output shaft for common rotation with said second output member.

2. A transmission for a four-wheel drive vehicle having an engine and front and rear drivelines, said transmission comprising:

an input shaft driven by the engine about a first rotary axis;

a mainshaft supported for rotation about a second rotary axis;

constant-mesh gearsets supported between said input shaft and said mainshaft;

synchronizer clutches for selectively engaging said gearsets for driving said mainshaft at speed ratios relative to said input shaft for establishing forward gears and a reverse gear;

a rear output shaft adapted for connection to the rear driveline and which is commonly aligned with said mainshaft for rotation about said second rotary axis;

a front output shaft adapted for connection to the front driveline and which is supported for rotation about a third rotary axis;

an interaxle differential for permitting speed differentiation between said rear output shaft and said front output shaft, said interaxle differential including an input member driven by said mainshaft, a first output member fixed for rotation with said rear output shaft, and a second output member;

a gear reduction unit including a sun gear fixed for rotation with said mainshaft, a ring gear, and a planet carrier fixed for rotation with said input member of said differential and having pinion gears meshed with said ring gear and said sun gear;

a range clutch supported for rotation with said ring gear and which is operable in a first position to couple said ring gear to said input member of said interaxle differential for establishing a direct speed ratio drive connection, and said range clutch is operable in a second position for coupling said ring gear to a stationary member for establishing a reduced speed ratio drive connection; and a transfer mechanism connecting said front output shaft for common rotation with said second output member.

3. A transmission for a four-wheel drive vehicle having an engine and front and rear drivelines, said transmission comprising:

an input shaft driven by the engine about a first rotary axis;

a mainshaft supported for rotation about a second rotary axis;

constant-mesh gearsets supported between said input shaft and said mainshaft;

synchronizer clutches for selectively engaging said gearsets for driving said mainshaft at speed ratios relative to said input shaft for establishing forward gears and a reverse gear;

a rear output shaft adapted for connection to the rear driveline and which is commonly aligned with said mainshaft for rotation about said second rotary axis;

a front output shaft adapted for connection to the front driveline and which is supported for rotation about a third rotary axis;

an interaxle differential for permitting speed differentiation between said rear output shaft and said front output shaft, said interaxle differential including an input member driven by said mainshaft, a first output member fixed for rotation with said rear output shaft, and a second output member;

a torque transfer apparatus for inhibiting speed differentiation across said interaxle differential in response to excessive speed differentials between said front and rear output shafts; and a transfer mechanism connecting said front output shaft for common rotation with said second output member.

4. The transmission of claim 3 wherein said torque transfer apparatus is operable for progressively limiting speed differentiation between said front and rear output shafts.

5. The transmission of claim wherein said torque transfer apparatus is a multi-plate transfer clutch operable for selectively limiting speed differentiation between said front and rear output shafts, and wherein said transmission further comprises:

an actuator for varying the actuated condition of said transfer clutch between a non-actuated state whereat unrestricted speed differentiation between said front and rear output shafts is permitted and a fully-actuated state whereat such speed differentiation is inhibited;

sensor means for detecting dynamic and operational characteristics of the vehicle and generating sensor input signals indicative thereof; and a controller for controlling actuation of said actuator in response to said sensor input signals.

6. A transmission for a four-wheel drive vehicle having an engine and front and rear drivelines, said transmission comprising:

an input shaft driven by the engine;

a mainshaft;

a plurality of constant-mesh gearsets supported between said input shaft and said mainshaft;

a plurality of clutches for selectively engaging one of said gearsets for driving said mainshaft at a predetermined speed ratio relative to said input shaft so as to establish forward gears and a reverse gear;

a gear reduction unit driven by said mainshaft at a reduced speed ratio relative thereto;

an interaxle differential having an input and first and second outputs;

a range clutch for selectively coupling said input of said interaxle differential to one of said mainshaft whereat a direct speed ratio drive connection is established and said gear reduction unit whereat said reduced speed ratio drive connection is established;

a rear output shaft coupled to said first output of said interaxle differential and adapted for connection to the rear driveline;

a front output shaft adapted for connection to the front driveline;

a torque transfer apparatus for inhibiting speed differentiation across said interaxle differential in response to excessive speed differentials between said front and rear output shafts; and a transfer mechanism connecting said front output shaft to said second output of said interaxle differential.

7. The transmission of claim 6 wherein said gear reduction unit includes a sun gear rotatably supported on said mainshaft, a non-rotatable ring gear, and a planet carrier having pinion gears meshed with said ring gear and said sun gear, and wherein said range clutch is movable between a first position whereat it directly couples said input to said mainshaft for establishing said direct speed ratio drive connection, a second position whereat it couples said sun gear to said mainshaft and said planet carrier to said input for establishing said reduced speed ratio drive connection, and a third position whereat said input is uncoupled from said mainshaft.

8. The transmission of claim 6 wherein said gear reduction unit includes a sun gear fixed for rotation with said mainshaft, a ring gear, and a planet carrier fixed for rotation with said input and having pinion gears meshed with said ring gear and said sun gear, and wherein said range clutch is supported for rotation with said ring gear and is movable between a first position whereat said range clutch couples said ring gear to said input for establishing said direct speed ratio drive connection, a second position for coupling said ring gear to a stationary member for establishing said reduced speed ratio drive connection, and a third position whereat said ring gear is permitted to rotate relative to said planet carrier and said sun gear for establishing a neutral mode.

9. The transmission of claim 6 wherein said torque transfer apparatus is a viscous coupling that is operable for progressively limiting speed differentiation between said front and rear output shafts.

10. The transmission of claim 6 wherein said torque transfer apparatus is a multi-plate transfer clutch operable for selectively limiting speed differentiation between said front and rear output shafts, and wherein said transmission further comprises:

an actuator for varying the actuated condition of said transfer clutch between a non-actuated state whereat unrestricted speed differentiation between said front and rear output shafts is permitted and a fully-actuated state whereat such speed differentiation is inhibited;

sensor means for detecting dynamic and operational characteristics of the vehicle and generating sensor input signals indicative thereof; and a controller for controlling actuation of said actuator in response to said sensor input signals, said controller causing said actuator to modulate the actuated condition of said transfer clutch as a function of said sensor input signals.

11. A transmission for a four-wheel drive vehicle having an engine and front and rear drivelines, said transmission comprising:

an input shaft driven by the engine about a first rotary axis;

a mainshaft supported for rotation about a second rotary axis;

constant-mesh gearsets supported between said input shaft and said mainshaft;

synchronizer clutches for selectively engaging said gearsets for driving said mainshaft at a predetermined speed ratio relative to said input shaft so as to establish a forward gear and a reverse gear;

a rear output shaft adapted for connection to the rear driveline and which is commonly aligned with said mainshaft for rotation about said second rotary axis;

a front output shaft adapted for connection to the front driveline and which is supported for rotation about a third rotary axis;

a gear reduction unit driven by said mainshaft at a reduced speed ratio relative thereto; said gear reduction unit including a sun gear rotatably supported on said mainshaft, a non-rotatable ring gear, and a planet carrier having pinion gears meshed with said ring gear and said sun gear;

a range clutch movable between a first position whereat it directly couples said rear output shaft to said mainshaft for establishing a direct speed ratio drive connection, and a second position whereat it couples said sun gear to said mainshaft and said planet carrier to said rear output shaft for establishing a reduced speed ratio drive connection; and a transfer clutch for transferring drive torque from said rear output shaft to said front output shaft in response to a predetermined slip therebetween.

12. A transmission for a four-wheel drive vehicle having an engine and front and rear drivelines, said transmission comprising:

an input shaft driven by the engine about a first rotary axis;

a mainshaft supported for rotation about a second rotary axis;

constant-mesh gearsets supported between said input shaft and said mainshaft;

synchronizer clutches for selectively engaging said gearsets for driving said mainshaft at a predetermined speed ratio relative to said input shaft so as to establish a forward gear and a reverse gear;

a rear output shaft adapted for connection to the rear driveline and which is commonly aligned with said mainshaft for rotation about said second rotary axis;

a front output shaft adapted for connection to the front driveline and which is supported for rotation about a third rotary axis;

a gear reduction unit driven by said mainshaft at a reduced speed ratio relative thereto;

a range clutch for selectively coupling said rear output shaft to either of said mainshaft and said gear reduction unit; and a transfer clutch for transferring drive torque from said rear output shaft to said front output shaft in response to a predetermined slip therebetween.

13. The transmission of claim 12 wherein said gear reduction unit includes a sun gear fixed to said mainshaft, a ring gear, and a planet carrier fixed to said rear output shaft and rotatably supporting pinion gears meshed with said sun gear and said ring gear, and wherein said range clutch is supported for rotation with said ring gear and is movable between a first position whereat said range clutch couples said ring gear to said rear output shaft for establishing a direct speed ratio drive connection, a second position for coupling said ring gear to a stationary member for establishing a reduced speed ratio drive connection, and a third position whereat said ring gear is permitted to rotate relative to said planet carrier and said sun gear for establishing a neutral mode.

14. The transmission of claim 12 wherein said transfer clutch is operable for progressively transferring drive torque from said rear output shaft to said front output shaft in response to increasing slip therebetween.

15. The transmission of claim 14 wherein said transfer clutch is a multi-plate assembly operable for selectively transferring drive torque from said rear output shaft to said front output shaft, and wherein said transmission further comprises:

an actuator for varying the actuated condition of said transfer clutch between a non-actuated state whereat all drive torque is delivered to said rear output shaft and a fully-actuated state whereat said front output shaft is rigidly coupled for common rotation with said rear output shaft;

sensor means for detecting dynamic and operational characteristics of the vehicle and generating sensor input signals indicative thereof; and a controller for controlling actuation of said actuator in response to said sensor input signals.

16. The transmission of claim 15 further comprising a mode select, mechanism for enabling a vehicle operator to select either one of an on-demand four-wheel high-range drive mode and a part-time four-wheel low-range drive mode, said mode select mechanism further operable for generating a mode signal indicative of the particular mode selected and which is inputted to said controller, whereby when said mode signal indicates selection of said on-demand four-wheel high-range drive mode, said range clutch is moved for selectively coupling said rear output shaft to said mainshaft to establish said direct speed ratio drive connection and the actuated condition of said transfer clutch is modulated as a function of the magnitude of said sensor input signals, and when said mode signal indicates selection of said part-time four-wheel low-range drive mode, said range clutch is moved for selectively coupling said rear output shaft to said gear reduction unit for establishing said reduced speed ratio drive connection and said transfer clutch is shifted to its fully-actuated state.

17. The transmission of claim 16 wherein said mode select mechanism further permits selection of a part-time four-wheel high-range drive mode whereat said range clutch couples said rear output shaft to said mainshaft for establishing said direct speed ratio drive connection and said transfer clutch is shifted to its fully-actuated state.

* * * * *

UNITED STATES PATENT AND TRADEMARK OFFICE
CERTIFICATE OF CORRECTION

PATENT NO. : 5,890,986
DATED : April 6, 1999
INVENTOR(S) : Larry A. Pritchard, Parvinder Ahluwalia It is certified that error appears in the above-identified patent and that said Letters Patent is hereby corrected as shown below:

Column 2, line 48, "FIG." should be --FIGS.--.

Column 4, line 60, "11 8" should be --118--.

Column 12, line 52, after "non-" delete --Attorney--.

Column 15, line 63, claim 5, after "Claim" insert --3--.

Column 18, line 62, claim 16, after "select" delete --,--.

Signed and Sealed this

Sixth Day of March, 2001

NICHOLAS P. GODICI

Attest:

Attesting Officer

Acting Director of the United States Patent and Trademark Office